United States Patent

Sala

[11] Patent Number: 5,740,878
[45] Date of Patent: Apr. 21, 1998

[54] MINIATURIZED SINGLE-SEATER MOTOR-VEHICLE, IN PARTICULAR FOR SPORTS AND RECREATIVE USE

[75] Inventor: Oscar Sala, Lissone, Italy

[73] Assignee: Birel S.R.L., Lissone, Italy

[21] Appl. No.: 563,271

[22] Filed: Nov. 27, 1995

[30] Foreign Application Priority Data

Dec. 23, 1994 [EP] European Pat. Off. ............ 94830587

[51] Int. Cl.⁶ .................................................. B60K 5/00
[52] U.S. Cl. ......................... 180/291; 180/312; 180/908; 296/177
[58] Field of Search .......................... 180/908, 291, 180/311, 312, 89.17, 58, 65.1, 215, 217, 333, 78; 280/781; 296/177

[56] References Cited

U.S. PATENT DOCUMENTS

| 3,650,344 | 3/1972 | Plessinger et al. | 180/217 |
|---|---|---|---|
| 3,829,117 | 8/1974 | Park | 180/291 |
| 4,325,448 | 4/1982 | Pivar | 180/215 |
| 4,407,383 | 10/1983 | Enokimoto et al. | 180/908 |
| 4,596,301 | 6/1986 | Nagashima | 180/89.17 |
| 4,629,023 | 12/1986 | Carpanelli et al. | 180/908 |
| 4,662,467 | 5/1987 | Arai et al. | 280/781 |
| 4,836,324 | 6/1989 | Morita et al. | 180/291 |

FOREIGN PATENT DOCUMENTS

| 2206453 | 8/1973 | Germany | 180/65.1 |
|---|---|---|---|
| 405105176 | 4/1993 | Japan | 180/65.1 |
| 676965 | 8/1952 | United Kingdom | 180/217 |
| 2092969 | 8/1982 | United Kingdom | 180/65.1 |

*Primary Examiner*—Eric D. Culbreth
*Assistant Examiner*—Min Yu
*Attorney, Agent, or Firm*—Laff, Whitesel, Conte & Saret, Ltd.

[57] ABSTRACT

A miniaturized single-seater motor-vehicle, in particular for sports and recreative use, comprises two half-frames (2a) identical with each other and substantially extending according to longitudinal vertical planes, each half-frame (2a) being formed of a plurality of sections (9, 11, 12, 13, 14) defining a substantially closed line. The frame (2) supports a motor (19) disposed forwardly of a rear axle (10) and at a lowermost position relative to a seat (10). A steering wheel (20) comprises a forward half portion (20b) and a rear half portion (20a) which are asymmetrical relative to an axis of rotation (21). Two side footboards (18) project laterally from the opposite sides of the frame (2) base.

13 Claims, 3 Drawing Sheets

MINIATURIZED SINGLE-SEATER MOTOR-VEHICLE, IN PARTICULAR FOR SPORTS AND RECREATIVE USE

BACKGROUND OF THE INVENTION

1. Field of the Invention

The present invention relates to a miniaturized single-seater motor-vehicle, in particular for sports and recreative use, comprising a frame, a rear axle supporting driving wheels, a motor fastened to the frame, a front axle supporting front wheels, a steering wheel rotating about a rotation axis and steering the front wheels, and a seat.

2. Prior Art

It is known that hitherto used motor-vehicles of reduced sizes above all for track racing, commonly known as "go-carts" from a class of very simplified motor-vehicles as they consist of the tubular frame alone with a generally single-cylinder engine, without the differential gear and suspensions.

In such vehicles the tubular frame extends in a horizontal plane substantially disposed at the height of the front and rear axles. The seat is place don the frame at a region included between the axles, and the engine is located behind the seat and before the rear axle.

The accelerator and foot-brake pedals are disposed close to the front axle; the driver can therefore stretch out his legs at least partly towards the front of the vehicle so as to practically discharge the weight of his body exclusively on the seat.

In bends, driving of a go-cart may require side shiftings by the driver so that he can partly transfer the weight of his body towards the inside of the trajectory. Other displacements are not allowed since the driver must always keep his feet on the pedals, while his legs are stretched out. In other words, go-carts are motor-vehicles the structure of which enables the driver to modify his driving position by his own weight only to a very reduced extent.

It is to be added that the construction technology of go-carts does not offer the possibility of reducing the sizes of same to such an extent that an easy transportation of said go-carts is enabled. In fact for transporting go-carts in the absence of a delivery van or other type of sufficiently capacious motor-vehicle, the use of particular trolleys or fastening of the go-cart to appropriate structures mounted on the roof of a conventional car is always required.

It will be also noted that in go-carts the distance between the seat and the pedals is necessarily correlated with the driver's height. As a result, go-carts adapted for persons short of stature, such as children for example, cannot be used for adults or tall people and vice-versa.

SUMMARY OF THE INVENTION

Under this situation, the technical task underlying the present invention is to conceive a miniaturized single-seater motor-vehicle, in particular for sports and recreative use, capable of substantially obviating the above drawbacks.

Within the scope of this technical task, it is an important object of the invention to provide a miniaturized single-seater motor-vehicle in which it is possible to change and go beyond the type of driving required for a go-cart by enabling a wide variety of behavioural attitudes on the road which can be controlled and varied at will.

Another important object of the invention is to provide a single-seater motor-vehicle of very reduced sizes so that it can be carried for example in the baggage compartment or boot of a standard car.

A still further object of the invention is to provide a motor-vehicle that, while exhibiting very reduced sizes, lends itself to be efficiently driven both by children and grown-ups without a particular adaptation in terms of construction and/or size being required.

The technical task mentioned and the object specified are substantially achieved by a miniaturized single-seater motor-vehicle, in particular for sports and recreative use, wherein: said frame comprises two half-frames substantially extending in planes disposed symmetrically in side by side relation with respect to a longitudinal vertical center plane, each half-frame being provided with a plurality of sections consecutively connected to each other to define a shaped profile substantially in the form of a closed loop an upper section of which supports said seat; said motor being located under said seat in a hollow space defined between said shaped half-frames, within said closed line profile; said steering wheel exhibiting a rim including a forward portion and a rear portion relative to the running direction of the motor-vehicle, said forward portion projecting more than said rear portion with respect to said rotation axis; a pair of footboards being associated with said frame, each of them projecting laterally from one of said half-frames.

BRIEF DESCRIPTION OF THE DRAWINGS

The description of a preferred embodiment of a miniaturized single-seater motor-vehicle according to the present invention is now given by way of non-limiting example with reference to the accompanying drawings, in which.

DESCRIPTION OF THE PREFERRED EMBODIMENT

Figure 1:
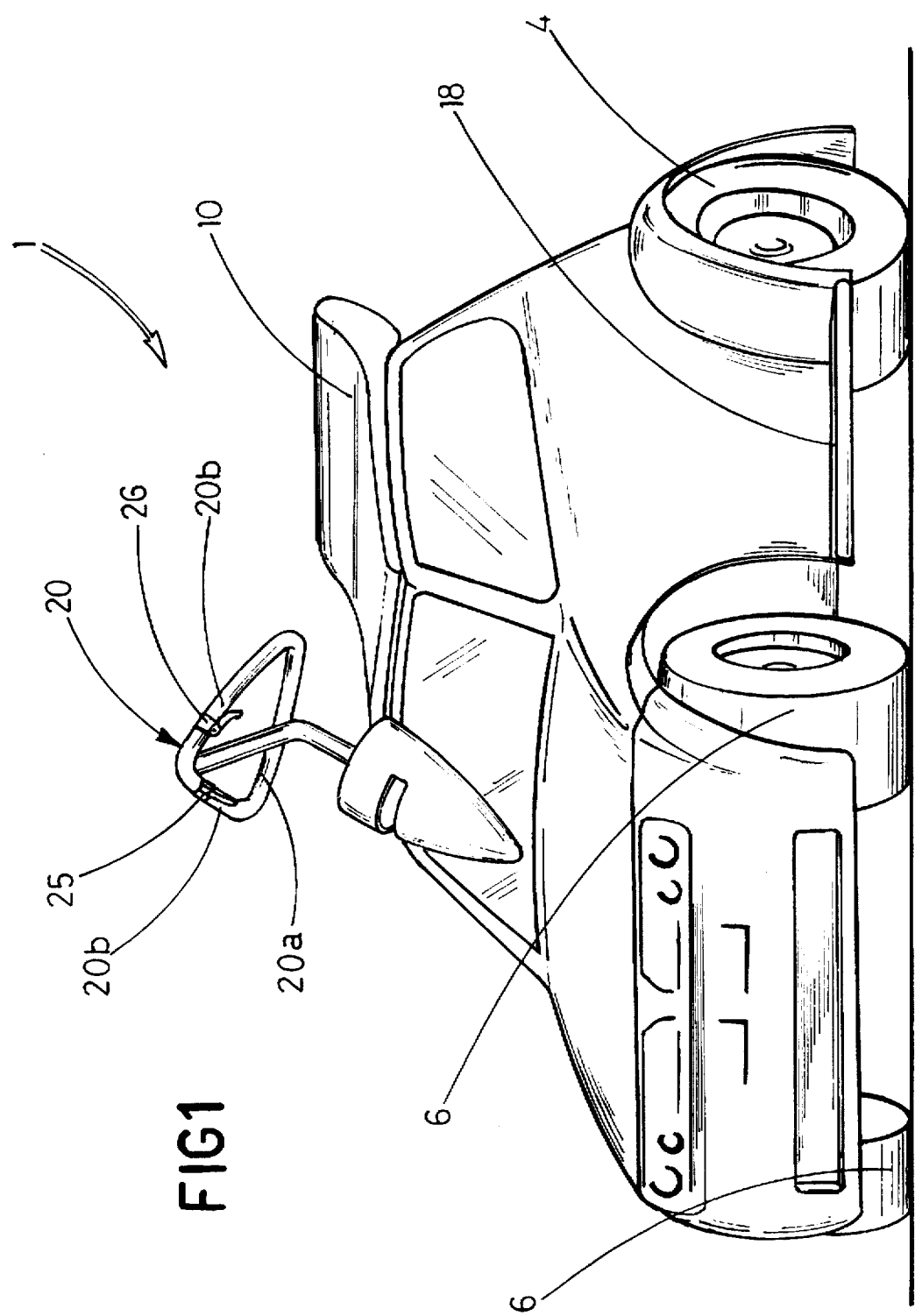
FIG. 1 is a perspective view of a miniaturized motor-vehicle according to the invention, including the vehicle body.
Figure 2:
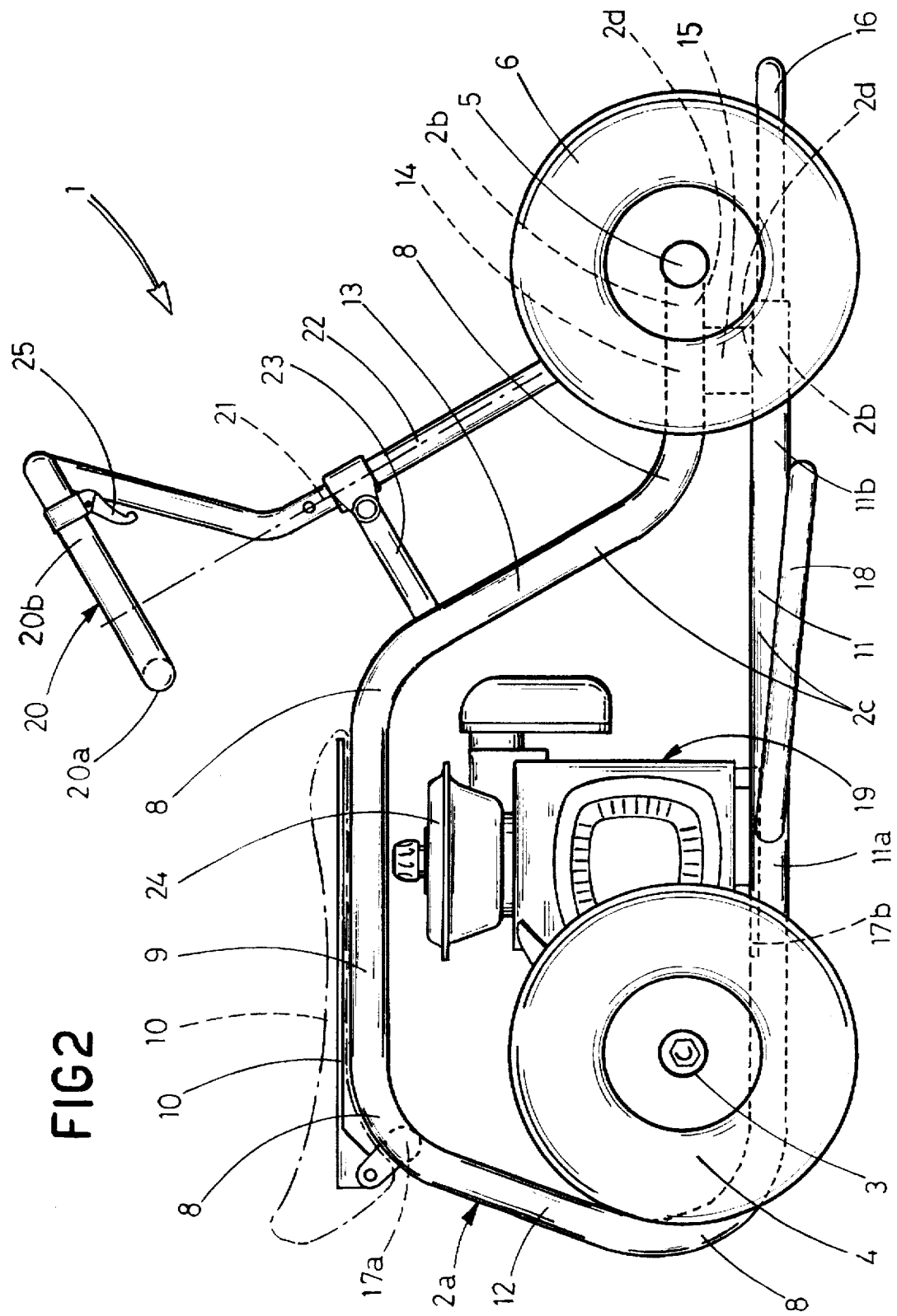
FIG. 2 is an elevational side view of the motor-vehicle shown in FIG. 1 without the vehicle body.
Figure 3:
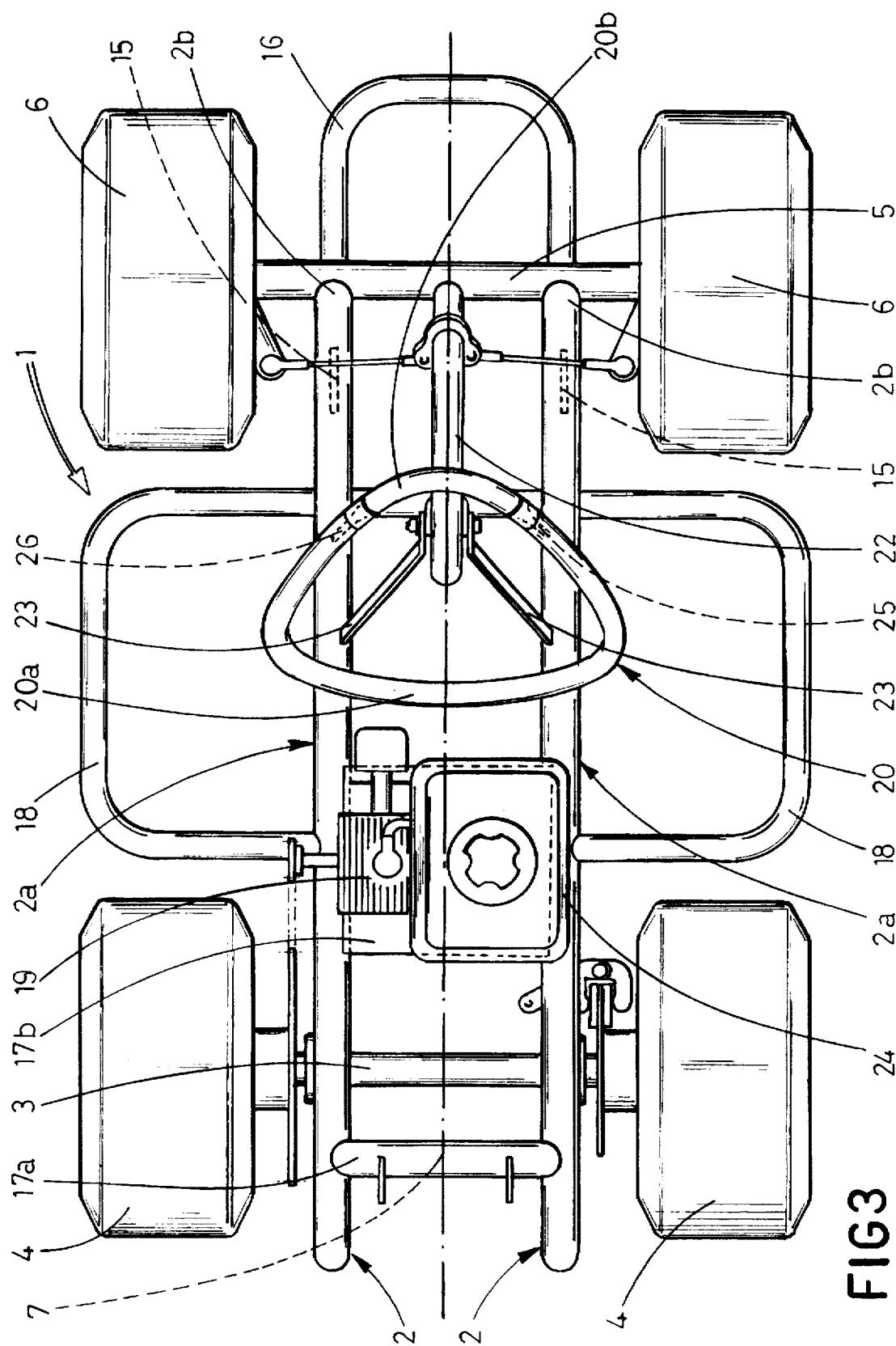
FIG. 3 is a plan view of the motor-vehicle shown in FIG. 1 without the vehicle body and seat.

Referring to the drawings, a miniaturized single-seater motor-vehicle according to the present invention, in particular for sports and recreative use, has been generally identified by reference numeral 1.

Motor-vehicle 1 is comprised of a frame 2, preferable of the tubular type, carrying a rear axle 3 supporting driving wheels 4 and a front axle 5 supporting front wheels 6.

In an original manner, the frame 2 is made of two half-frames 2a, identical with each other and substantially extending in vertical planes disposed symmetrically in side by side relation with respect to a longitudinal vertical center plane 7. Each half-frame 2a is substantially defined by a single tube the ends 2b of which get close to each other in a superposed position and comprising a plurality of consecutive tubular sections connected to each other by curved tubular lengths 8 so as to form a shaped profile.

This profile is in the form of a loop substantially closed upon itself and exhibiting an upper section 9 on which a seat 10 is carried.

More particularly, the shaped profile in each half-frame 2a comprises a rear-center stretch 2c rotatably engaging the rear axle 3. Said rear-centre stretch 2c has a configuration substantially in the form of a trapezium the minor basis of which is defined by the upper section 9 supporting the seat 10.

Extending in cantilevered fashion from the major base of said trapezium configuration is a front length 2b integrally carrying the front axle 5, at the opposite ends of which the hubs of the front steering wheels 6 are rotatably engaged in a manner known per se.

In more detail, each half-frame 2a in addition to the horizontal upper section 9 coinciding with said minor base of the trapezium configuration, exhibits a horizontal lower section 11 exhibiting a rear-center portion 11a, corresponding to the major base of said trapezium and an end portion 11b disposed in the extension of the rear-center portion. Also provided is an oblique rear section 12, corresponding to the first side of the trapezium departing from the lower section according to an inclination included between 55° and 90°, in the order of 70° for example, as well as an oblique front section 13, corresponding to the second side of the trapezium and having an inclination included between 45° and 90°, equal to 60° for example, with respect to the horizontal lower section.

Extending from the front section 13 is an end front section 14 placed parallelly above the end front portion 11b of the lower section 11. This end portion 11b and the end front section 14 practically define the front length 2d of the half-frame 1a and are made integral with each other by a spacer means 15, in the form of a plate for example, closing the shaped profile of the half-frame 2a itself close to the neared and superposed ends 2b of said half-frame.

The end portions 11b of the two half-frames 2a are rigidly connected with each other by a substantially U-shaped tubular front element 16 which frontally projects with respect to the front wheels.

The half-frames 2a are also rigidly linked to each other at other locations along their extension, so as to give an appropriate structural stiffness to the frame 2 as a whole. More particularly, they are not only connected to each other by the front and rear axles 3 and 5, but also by a first transverse element 17a, perpendicular to the centre plane 7 and located on the curved length 8 included between the upper section 9 and the oblique rear section 10 of each half-frame 2a.

Also provided is a pair of side footboards 18 the bearing structure of which is formed of a single tube substantially bent in the form of a C and having its ends welded to the lower sections 11 of the two half-frames 2a. The central length of said "C" too which is perpendicular to the two lower sections 11, is welded to the latter and therefore forms another connecting element between the two half-frames 2a.

The motor-vehicle 1 is provided with a motor 19 fastened to the second plate-like transverse element 17b integral with the lower sections 11, forwardly of the rear axle 3. Therefore the motor 19 is located at a lowermost position relative to the seat 9 and within a hollow space included between the trapezium-shaped rear-center stretches of the half-frames 2a.

Advantageously the seat 9 is rotatably engaged with the first transverse element 17a so as to be overturned and enable an easy access to the underlying motor 19.

Said motor may be an internal-combustion engine having a fuel tank 24 interposed between the engine itself and the seat 10, or an electric motor with a power supplying battery also interposed between the seat and the motor.

Finally, the steering members for the front wheels 6 comprise a steering wheel 20 rotatable about a rotation axis 21 defined by a steering column 22 connected, by means of supports 23, to the oblique front sections 13 of the half-frames 2a. The steering column 22 and therefore the rotation axis 21 of the steering wheel 20 is advantageously inclined to a horizontal direction, according to an angle included between 30° and 90°, preferably of 60°. The steering wheel 20 exhibits a rim which in an original manner substantially has the form of an isosceles triangle provided with curved sides. The axis of rotation 21 is disposed close to the centre line of the base: in this manner, when the vehicle is running on a rectilinear track said base defines a rear half-portion 20a of the steering wheel which, relative to the axis of rotation 21, projects less than a forward half-portion 20b defined by the oblique sides of the triangle.

Also associated with the motor-vehicle 1 are appropriate control devices for an accelerator and a braking installation, not described in detail as known per se and conventional. It is however to be pointed out that such control devices advantageously comprise at least one first hand grip and one second hand grip, 25, 26 designed to control the accelerator and brake respectively and mounted on the forward half-portion 20b of the steering wheel 20, at laterally opposite positions, so that each of them is operated by one of the driver's hands.

The above described structural features of the motor-vehicle according to the invention enable the driver to shift his weight, whenever he wants, in a controlled manner both in the lateral and longitudinal direction, thereby greatly affecting the running behaviour of the vehicle.

In fact the driver can discharge his weight not only on the seat, but also on the side footboards, exclusively provided for resting the feet, and on the steering wheel by leaning his trunk forward at will.

As the rear axle is located under the seat, a displacement in the longitudinal direction of the driver's weight greatly affects the load to which the rear axle itself is submitted.

Due to its particular and original shape, the bulkiness of the steering wheel towards the driver is reduced and the driver has more room at his disposal, which is particularly advantageous in the case of tall drivers. The shape of the steering wheel, by imposing a gripping position turned towards the vehicle front, also enables the front axle to be loaded to the desired amount with part of the driver's weight.

In addition, by virtue of the particular profile of the half-frames forming the vehicle frame, the use of the spaces necessary to house the motor and the seat can be optimized and, as a result, the distance between centers of the front and rear wheels can be reduced, so that the longitudinal overall dimensions will not exceed a value of 100 cm for example, which will bring about easy transportation of the motor-vehicle.

Finally, it is important to note that the particular embodiment shown is also advantageous in its most specific aspects.

What is claimed is:

1. A miniaturized single-seater motor-vehicle comprising:
   a frame (2);
   a rear axle (3) supporting driving wheels (4);
   a motor (19) fastened to the frame (2);
   a front axle (5) supporting front wheels (6);
   a steering wheel (20) rotating about a rotation axis (21) for steering said front wheels;
   a seat (10) engaged to the frame (2), wherein:
      said frame (2) comprises two half-frames (2a) substantially extending in planes disposed symmetrically in side by side relation with respect to a longitudinal vertical center plane (7), each half-frame (2a) being provided with a plurality of sections (9, 11, 12, 13, 14) consecutively connected to each other to define a shaped profile substantially in the form of a closed loop an upper section (9) of which supports said seat (10);

said motor (19) is located under said seat in a hollow space defined between said shaped half-frames (2a), within said closed loop profile;

said steering wheel (20) exhibits a rim including a forward portion (20b) and a rear portion (20a) relative to the running direction of the motor-vehicle, said forward potion (20b) projecting more than said rear portion (20b) with respect to said rotation axis (21);

a pair of footboards (18) being associated with said frame (2), each of them projecting laterally from one of said half-frames (2a).

2. The motor-vehicle as claimed in claim 1, wherein each of said half-frames (2a) comprises:

a rear-center stretch (2c) exhibiting a substantially trapezium-shaped configuration having a minor base defined by said upper section (9) supporting the seat (10), and a front length (2d) extending in cantilevered fashion relative to a major base of said trapezium.

3. The motor-vehicle as claimed in claim 2, wherein each half-frame (2a) further comprises:

a substantially horizontal lower section (11) exhibiting a rear-centre portion (11a) corresponding to the major base of said trapezium, followed by a front end portion (11b);

an oblique rear section (12) and an oblique front section (13) substantially corresponding to the trapezium sides; and an end front section (14) following said oblique front section (13) and parallelly superposed on the end front portion (11b) of said lower section (11), said end front section (14) and the end front portion (11b) of said lower section (11) defining the front length (2d) of said half-frame (2a).

4. The motor-vehicle as claimed in claim 3, wherein curved lengths (8) are provided which are adapted to connect said sections, (9, 11, 12, 13, 14) to each other, each half-frame (2a) being substantially defined by a single tube bent at said curved length (8) and exhibiting ends in closed proximity and superposed one above the other (2b) at said front length (2d).

5. The motor-vehicle as claimed in claim 4, wherein each half-frame (2a) comprises a spacer (15) integral with said end front section (14) and said end front portion (11b) so as to close the extension line thereof substantially close to the neared and superposed ends (2b) of said tube.

6. The motor-vehicle as claimed in claim 3, wherein said oblique rear section (12) rises from the lower section (11) according to an inclination included between 55° and 90°, said oblique front section (13) exhibiting an inclination in the range of 45° to 90° with respect to the lower section itself.

7. The motor-vehicle as claimed in claim 1, wherein the frame (2) comprises transverse connecting elements (17a, 17b) extending perpendicularly to said longitudinal center plane (7) to make said half-frames (2a) integral with each other.

8. The motor-vehicle as claimed in claim 2, wherein the frame (2) comprises a substantially U-shaped tubular front element (16) frontally projecting with respect to the front wheels integral at the ends with said front length (2d) of said half-frames (2a).

9. The motor-vehicle as claimed in claim 1, further comprising at least one first and one second hand grip (25, 26) arranged to respectively control an accelerator and a brake, said hand grips being mounted on the forward portion (20b) of the steering wheel (20), at laterally opposite positions.

10. The motor-vehicle as claimed in claim 1, wherein said seat (10) is rotatably in engagement with said frame (2) to be tilted from an operating position in which it extends horizontally on the frame (2) to an overturned position in which access to the motor (19) disposed under it is made possible.

11. The motor-vehicle as claimed in claim 1, further comprising a tank (24) interposed between the motor (19) and said seat (10), the motor (19) being an internal-combustion engine.

12. The motor-vehicle as claimed in claim 1, further comprising a battery interposed between the motor (19) and said seat (10), the motor being an electric motor.

13. The motor vehicle as claimed in claim 1, wherein said steering wheel (20) rim substantially has the shape of an isosceles triangle with curved sides, in which said forward half-portion (20b) of the rim is defined by the oblique sides of said triangle and said rear half-portion (20a) is defined by the base, said rotation axis (21) being disposed close to said base.

* * * * *